US010627976B2

(12) United States Patent
Ali et al.

(10) Patent No.: US 10,627,976 B2
(45) Date of Patent: Apr. 21, 2020

(54) SMART NOTIFICATIONS

(71) Applicant: Microsoft Technology Licensing, LLC, Redmond, WA (US)

(72) Inventors: Zohaib H. Ali, Everett, WA (US); Kenneth Fern, Bellevue, WA (US); Sara Manning L. M. Dawson, Bellevue, WA (US); Joseph Masterson, Issaquah, WA (US); Srinivasa Reddy Manda, Sammamish, WA (US); Eduardo Da Fonseca Melo, Seattle, WA (US); Jun Yan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 736 days.

(21) Appl. No.: 14/858,007

(22) Filed: Sep. 18, 2015

(65) Prior Publication Data
US 2017/0083165 A1    Mar. 23, 2017

(51) Int. Cl.
G06F 3/0481    (2013.01)
H04L 12/24    (2006.01)
H04L 29/08    (2006.01)

(52) U.S. Cl.
CPC ........ *G06F 3/0481* (2013.01); *H04L 41/0609* (2013.01); *H04L 41/0622* (2013.01); *H04L 41/0618* (2013.01); *H04L 67/306* (2013.01)

(58) Field of Classification Search
CPC .................................................... G06F 3/0481
See application file for complete search history.

(56) References Cited

U.S. PATENT DOCUMENTS 7,068,189 B2    6/2006 Brescia
7,493,372 B2    2/2009 Crabtree et al.
(Continued)

FOREIGN PATENT DOCUMENTS

FR    3001854 A1    8/2014

OTHER PUBLICATIONS

Darwell, Brittany, "Facebook Lets Users Rate Any Place And Change Their Ratings From Desktop Pages", Published on May 15, 2013 Available at: http://www.adweek.com/socialtimes/facebook-lets-users-rate-any-place-and-change-their-ratings-from-desktop-pages/293536, 6 pages.
(Continued)

*Primary Examiner* — Jennifer N To
*Assistant Examiner* — Ashley M Fortino
(74) *Attorney, Agent, or Firm* — Michael Best & Friedrich LLP

(57) ABSTRACT

Controlling notifications based on an importance of the notifications to users is described. A service provider can receive notifications. The service provider can determine an order for sending the notifications based partly on priority levels assigned to the notifications and positions associated with presentations of the notifications. The service provider can send a first notification to at least one device in a first period of time. The service provider can determine that sending a second notification causes a conflict with a presentation policy. Accordingly, the service provider can determine a second period of time subsequent to the first period of time to send the second notification to the at least one device based partly on a lapse of a predetermined amount of time and/or an occurrence of an event, and can send the second notification to the at least one device in the second period of time.

19 Claims, 9 Drawing Sheets

(56) References Cited

U.S. PATENT DOCUMENTS

| | | | |
|---|---|---|---|
| 7,617,162 B2 | 11/2009 | Saini | |
| 7,877,356 B1 | 1/2011 | Guiheneuf et al. | |
| 8,073,495 B2 | 12/2011 | Chiu et al. | |
| 8,595,323 B2 | 11/2013 | Deane et al. | |
| 8,612,534 B1 | 12/2013 | Hossack | |
| 8,924,493 B1 | 12/2014 | Yeskel et al. | |
| 2004/0068481 A1 | 4/2004 | Seshadri et al. | |
| 2006/0130075 A1* | 6/2006 | Rhoten | G06F 3/14 719/328 |
| 2009/0305744 A1 | 12/2009 | Ullrich | |
| 2010/0043062 A1* | 2/2010 | Alexander | G06F 21/36 726/6 |
| 2010/0156631 A1 | 6/2010 | Roth | |
| 2010/0281409 A1* | 11/2010 | Rainisto | G06F 9/451 715/767 |
| 2012/0192086 A1 | 7/2012 | Ghods et al. | |
| 2012/0252416 A1 | 10/2012 | Kissinger et al. | |
| 2012/0295645 A1* | 11/2012 | Yariv | H04L 67/322 455/466 |
| 2012/0323933 A1 | 12/2012 | He et al. | |
| 2014/0280657 A1* | 9/2014 | Miller | H04L 51/26 709/207 |
| 2016/0119897 A1* | 4/2016 | Kim | H04L 11/00 455/569.2 |

OTHER PUBLICATIONS

"How to Use Android Lollipop's Notification and Interruption", Published on Mar. 15, 2015 Available at: http://gadgetguideonline.com/android/lollipop/how-to-use-android-lollipops-notification-and-interruption/, 28 pages.

"Push Notification In-App Formats", Published on: Sep. 26, 2014 Available at: https://www.accengage.com/push-notification-formats/, 7 pages.

"International Search Report and Written Opinion for PCT/US2016/050844", dated Nov. 16, 2016. 12 Pages.

"International Preliminary Report on Patentability Issued in PCT Application No. PCT/US2016/050844", dated Jul. 31, 2017, 6 Pages.

\* cited by examiner

SMART NOTIFICATIONS

BACKGROUND

Notifications are alerts that pop-up on user interfaces of computing devices to communicate information to users of the computing devices. Various types of notifications are used to communicate the information to the users. For example, notifications include alerts to inform users of problems, opportunities for improvement, updates to products, announcements of new features, etc. As an increasing number of applications, service providers, websites, etc. publish an increasing number of notifications, users are often overwhelmed by the number of notifications they receive on their computing devices. As a result, notifications are often ignored by users and accordingly, may not be useful and/or effective in communicating important information.

SUMMARY

This disclosure describes techniques for controlling notifications based on an importance of the notifications to users. This disclosure describes receiving, by a service provider, notifications that can be associated with a profile corresponding to one or more devices. The service provider can determine an order for sending the notifications based at least in part on priority levels assigned to the notifications and positions associated with presentations of the notifications. The positions can correspond to regions of a user interface where the notifications are to be presented. Moreover, this disclosure describes sending, from the service provider, a first notification of the notifications to at least one device of the one or more devices in a first period of time. The service provider can determine that a second notification of the notifications exceeds a predetermined number of notifications to be sent to the one or more devices in the first period of time. Accordingly, this disclosure describes determining a second period of time subsequent to the first period of time to send the second notification to the at least one device based at least in part on a lapse of a predetermined amount of time and/or an occurrence of an event and sending the second notification to the at least one device in the second period of time.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying FIG. s, in which the left-most digit of a reference number identifies the FIG. in which the reference number first appears. The use of the same reference numbers in the same or different FIG. s indicates similar or identical items or features.

DETAILED DESCRIPTION

Figure 1:
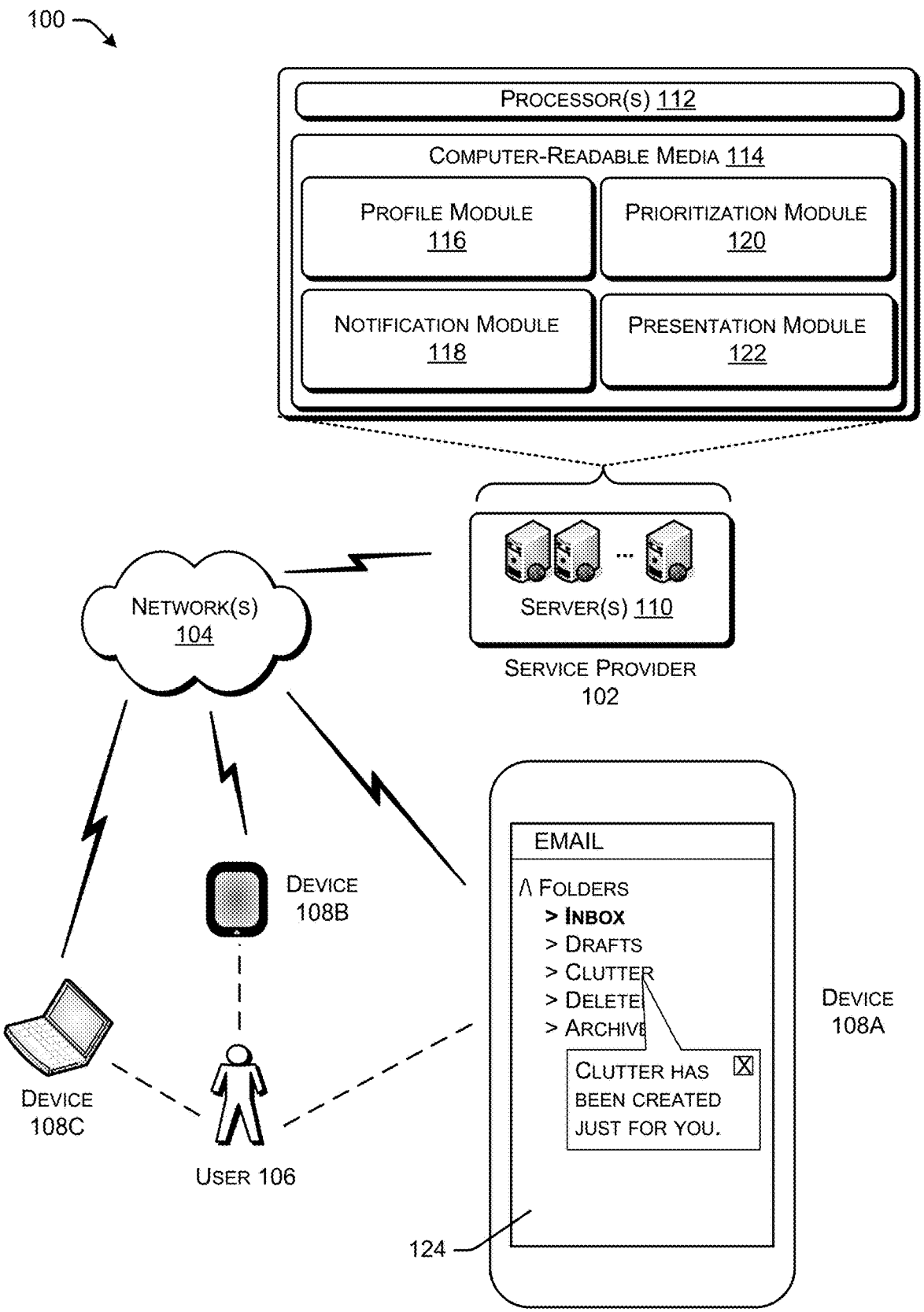
FIG. 1 is a schematic diagram showing an example environment for controlling notifications based at least in part on the importance of the notifications to users.

This disclosure describes techniques for controlling notifications based on an importance of the notifications to users. More specifically, the techniques described herein leverage a prioritization policy and presentation policy to determine an order and timing for sending notifications to devices associated with the users so as to minimize disruption to users interacting with their devices. By regulating the order and/or timing that the notifications are sent to devices, notifications can alert users of information while allowing users to interact with their devices without unnecessary interruptions. That is, the techniques described herein improve the experience of users in interacting with their devices. Additionally, by decreasing the number of notifications that are sent to devices, the techniques described herein increase processing speeds and reduce processor loads to improve the efficiency in which devices can process and/or send notification requests.

As described above, notifications are alerts that pop-up on user interfaces of devices to communicate information to users of the devices. Notifications can be presented to a user via a user interface, e-mail, text message, push notification, etc. Various types of notifications are used to communicate the information to the users. As non-limiting examples, notifications can include alerts to inform users of problems, opportunities for improvement, updates to products, announcements of new features, etc. For the purposes of this discussion, a notification can include a data packet including text to be communicated to one or more users and a function to enable the one or more users to interact with the notification. As a non-limiting example, the function can include a control to be presented on the user interface to provide functionality for the user to rate or dismiss the notification. For instance, the control can correspond to a sliding scale, a multiple choice question, a Likert question, a drop down menu, or other mechanisms for providing functionality for the user to indicate whether the user likes or dislikes the notification. Additionally and/or alternatively, the control can correspond to a mechanism for providing functionality for the user to dismiss the notification, including but not limited to, an "accept" control, a "dismiss" control, a control marked by a particular graphic (e.g., "x"), etc.

Techniques described herein include receiving, by a service provider, notifications that can be associated with a profile corresponding to one or more devices. The techniques described herein further include determining, by the service provider, an order for sending the notifications based at least in part on priority levels assigned to the notifications and positions associated with presentations of the notifications. The positions can correspond to regions of a user interface where the notifications are to be presented. Moreover, the techniques described herein include sending, from the service provider, a first notification of the notifications to at least one device of the one or more devices in a first period of time. The service provider can determine that a second notification of the notifications exceeds a predetermined number of notifications to be sent to the one or more devices in the first period of time. Accordingly, this disclosure describes determining a second period of time subsequent to the first period of time to send the second notification to the at least one device based at least in part on a lapse of a predetermined amount of time and/or an occurrence of an event and sending the second notification to the at least one device in the second period of time.

As described above, by leveraging a prioritization policy and/or presentation policy, the techniques described herein minimize the number of notifications that are presented to users. Accordingly, the techniques described herein minimize notification overload and enable users to have an improved experience when interacting with devices. For instance, the techniques described herein enable users to receive alerts and information that are relevant to the users while still allowing users to interact with applications associated with the devices without recurring notifications interrupting their interactions.

As a non-limiting example, a user can logon to his or her e-mail account (e.g., OUTLOOK®, GMAIL®, etc.). As the user signs-on, the service provider can cause a first notification to be presented to the user that prevents the user from accessing his or her e-mails. Content associated with the first notification can be critical information such as security, compliance, etc. and/or indicated to be a preferred notification by the user. The prioritization and/or presentation policy can prevent the user from receiving an immediately subsequent second notification that again prevents the user from accessing his or her e-mails. The service provider can present the second notification at a subsequent time determined based at least in part on a lapse of a predetermined period of time or occurrence of an event. Additionally and/or alternatively, the service provider can present a third notification immediately subsequent to presenting the first notification and/or concurrently with the first notification if the third notification does not prevent the user from accessing his or her e-mails. That is, the prioritization policy and/or presentation policy minimize the number of notifications that are presented to the user thereby enabling the user to have an improved experience when interacting with his or her e-mail account.

As another non-limiting example, a user can logon to his or her e-note taking account (e.g., ONENOTE®, LIVESCRIBE®, etc.). As the user signs-on, the service provider can cause a first notification to be presented to the user that prevents the user from accessing his or her note taking functionality. Again, content associated with the first notification can be critical information such as security, compliance, etc. and/or indicated to be a preferred notification by the user. The prioritization and/or presentation policy can prevent the user from receiving an immediately subsequent second notification that again prevents the user from accessing his or her note taking functionality. The service provider can present the second notification at a subsequent time determined based at least in part on a lapse of a predetermined period of time or occurrence of an event. Additionally and/or alternatively, the service provider can present a third notification immediately subsequent to presenting the first notification and/or concurrently with the first notification if the third notification does not prevent the user from accessing his or her note taking functionality. That is, the prioritization policy and/or presentation policy minimize the number of notifications that are presented to the user thereby enabling the user to have an improved experience when interacting with his or her e-note taking account.

Illustrative Environments

FIG. 1 is a schematic diagram showing an example environment 100 for controlling notifications based at least in part on the importance of the notifications to users. More particularly, the example environment 100 can include a service provider 102, one or more networks 104, one or more users 106, and one or more devices 108A, 108B, 108C (collectively "devices 108") associated with the one or more users 106. In some examples, one or more user profiles corresponding to the one or more users 106 can be associated with one or more of the devices 108. As a non-limiting example, in example environment 100, user 106 is associated with device 108A, device 108B, and device 108C. As will be described in detail, techniques disclosed herein can involve any number of computing devices configured to control notifications based at least in part on the importance of the notifications to users. This example is provided for illustrative purposes and is not to be construed as limiting. It can be appreciated that the example environment 100 can include any number of devices 108 and/or any number of service providers 102. Additional details associated with example environment 100 are described in FIGS. 7-9 below.

The service provider 102 can be any entity, server(s), platform, etc., that facilitates determining an order and/or timing for sending notifications to devices 108 and sending the notifications to the devices 108 pursuant to the determined order and/or timing. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can receive and/or access notifications associated with one or more applications, service providers, websites, etc. The service provider 102 can determine an order for sending the notifications to devices 108 based at least in part on a prioritization policy. Additionally and/or alternatively, the service provider 102 can determine timing for sending the notifications to the devices 108 based at least in part on a presentation policy. The service provider 102 can send notifications to the devices 108 pursuant to the determined order and timing. In some examples, the service provider 102 can receive feedback associated with the notifications and can leverage the feedback for improving (or disabling) the notifications.

The networks 104 can facilitate communication between the server(s) 110 and the devices 108 associated with the one or more users 106 In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, etc.). In addition, the devices 108 can communicate using any other technology such as BLUETOOTH, NFC, or any other suitable light-based, wired, or wireless technology. It should be appreciated that many more types of connections may be utilized than illustrated in FIG. 1.

Examples support scenarios where device(s) that can be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Device(s) that can be included in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, a profile module 116, a notification module 118, a prioritization module 120, a presentation module 122, and other modules, programs, or applications that are loadable and executable by the processor(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The one or more server(s) 110, which can be associated with different service providers 102, can also include components, such as the components shown in FIG. 8, for executing one or more aspects of the techniques described herein. As will be described in more detail herein, a server module may operate in conjunction with other modules or devices to implement aspects of the techniques disclosed herein.

Processing unit(s) (e.g., processor(s) 112) can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems. Additional details associated with the processing unit(s) are described in FIG. 9 below.

In at least one configuration, the computer-readable media 114 of the server(s) 110 can include components that facilitate interaction between the service provider 102 and the one or more devices 108. The components can represent pieces of code executing on a computing device. For example, the computer-readable media 114 can include the profile module 116, the notification module 118, the prioritization module 120, the presentation module 122, etc. In at least some examples, the modules (116, 118, 120, 122, etc.) can be implemented as computer-readable instructions, various data structures, and so forth via at least one processing unit(s) (e.g., processor(s) 112) to configure a device to execute instructions and to determine an order for sending notifications to devices 108 and sending the notifications pursuant to the determined order. Functionality to perform these operations can be included in multiple devices or a single device. Additional details associated with the computer-readable media 114 are provided below in FIG. 7.

The profile module 116 can store data (e.g., user data) associated with the one or more users 106. The data can be mapped to and/or otherwise associated with profiles that correspond to individual users 106. The profiles that correspond to the individual users 106 each can be associated with unique identifiers. One or more devices 108 can be associated with an individual profile corresponding to the unique identifier. The profile module 116 can receive data associated with the one or more users 106 from the one or more users 106 and/or on behalf of the one or more users 106 and/or access data associated with one or more users 106 via third party sources and systems (e.g., social networks, professional networks, etc.). In some examples, one or more users 106 can input data when they set up their profile for interacting with the service provider 102, an application (e.g., application(s) 128, etc.), a website, etc., in response to a prompt for data, etc. In at least one example, the one or more users 106 can input data associated with preferences for receiving notifications. As a non-limiting example, the one or more users 106 can indicate that they "always" or "never" want to receive notifications associated with a specified content, can specify a preferred delivery mechanism, time, frequency, service provider, application, website, etc. In some examples, the one or more users 106 can indicate that they prefer to see notifications associated with a specified content, delivery mechanism, time, service provider, application, website, etc. at a predetermined time and/or after an occurrence of an event. As an additional and/or alternative non-limiting example, the one or more users 106 can indicate that they want to receive no more than a specified number of notifications during a predetermined period of time.

The notification module 118 can access, receive, create, and/or store notifications. The notifications can be associated with one or more applications (e.g., application(s) 128), service providers (e.g., service provider 102), websites, etc. As described above, the notifications can each include a data packet including text to be communicated to one or more users 106 and a function to enable the one or more users 106 to interact with the notification. The notifications each can be associated with metadata indicating information about the notifications. The metadata can be communicated with the notification from the notification source (e.g., applications (e.g., application(s) 128), service providers (e.g., service provider 102), websites, etc.).

In at least one example, the metadata can indicate the source of the notification, purpose of the notification, etc. as indicated by the designer of the notification (e.g., program manager, project manager, etc.). In at least one example, the metadata can be associated with an identifier corresponding to an individual notification that indicates that content of the notification is associated with security, compliance, an update, a new feature, an upsell opportunity (e.g., an notification offering new products and/or services), etc. The individual notifications can be associated with data indicating timing for when an individual notification is recommended to be sent to a device 108. The metadata can include the data indicating the timing. Additionally, the individual notifications can be associated with expiration data indicating a period of time after which an individual notification expires. The metadata can include the expiration data. The individual notifications each can be associated with a region in a user interface in which the individual notifications are presented. The metadata can include information about the region in the user interface in which an individual notification is to be presented. Furthermore, the individual notifications each can be associated with one or more events (e.g., triggering events), the occurrence of which causes the notification to be sent to at least one device (e.g., device 108A, device 108B, and/or device 108C). The metadata can include information about the one or more events.

In at least one example, the notification module 118 can include a queue that can store notifications. The prioritization module 120, as described below, can leverage a prioritization policy to determine an order for storing the notifications in the notification module 118. The presentation module 122, as described below, can access the notifications from the queue associated with the notification module 118 and leverage a presentation policy for determining if and/or when to send the notifications to devices 108.

The prioritization module 120 can leverage a prioritization policy to determine an order for sending the notifications to devices 108. The prioritization policy can include one or more rules specifying a priority level for each individual notification of the notifications. A priority level corresponds to an importance of a notification relative to other notifications in the notification module. Notifications can be associated with priority levels ranging from P0 to PN, where N is any integer greater than zero. A notification with a priority level of P0 represents a notification that is of the most importance. A priority level of P1 represents a notification that is less important than a P0 priority level but more important than P2, P3, P4, . . . , PN priority levels. Notifications that are associated with different priority levels can be sent to the at least one device (e.g., device 108A, device 108B, and/or device 108C) during same periods of time or different periods of time, based at least in part on the prioritization policy and/or presentation policy.

The prioritization module 120 can leverage the priority levels to determine the order for sending the notifications to the devices 108. The prioritization policy can assign a priority level to an individual notification based at least in part on the metadata identifying the source of the individual notification, whether content associated with the individual notification is associated with security, compliance, an update, a new feature, an upselling opportunity, etc., the timing associated with the individual notification, etc. The prioritization policy can assign a highest priority level to notifications including content associated with security and/or compliance and can assign successively lower priority levels to notifications including content associated with content expressly requested by the user 106 (e.g., per data associated with the profile associated with the user 106, described above), an update, a new feature, an upsell opportunity, etc., respectively. Table 1 below is an example of a plurality of notifications and corresponding priority levels determined by the prioritization policy.

TABLE 1

| Notification Type | Priority Level |
| --- | --- |
| Content Associated with Security and/or Compliance Alert | P0 |
| Content Associated with User Requested Notification | P1 |
| Content Associated with a Product Update Notification | P2 |
| Content Associated with a New Feature Notification | P3 |
| Content Associated with an Upsell Opportunity | P4 |

In addition to leveraging the priority level to determine the order for sending the notifications, the prioritization policy can determine the order for sending the notifications to the devices 108 based at least in part on positions associated with presentations of the notifications. That is, the prioritization policy can consider a region on a user interface where a notification is to be displayed and whether that region can conflict and/or interfere with a task the user 106 is attempting to perform, as described below.

In some examples, the prioritization policy can determine the order for sending the notifications to the devices 108 based at least in part on a timestamp associated with when a notification is received. For instance, in a non-limiting example, if the notification module 118 receives two notifications and the prioritization module 120 determines that the notifications are both associated with priority levels of P3, a first notification associated with the timestamp earlier in time can be ordered before a second notification associated with the timestamp later in time. Accordingly, the first notification can be sent to one or more devices 108 before the second notification.

In other examples, the prioritization policy can determine the order for sending the notifications to the devices 108 based at least in part on expiration data associated with the notifications. For instance, in a non-limiting example, if the notification module 118 receives three notifications and the prioritization module 120 determines that the notifications are all associated with priority levels of P2, the notification that expires first in time can be ordered before the notifications that expire later in time. Accordingly, the notification that expires first in time can be sent to one or more devices 108 before the other notifications.

Additionally and/or alternatively, the prioritization policy can determine the order for sending the notifications to the devices 108 based at least in part on semantically mining the notifications to identify particular words that can be relevant for determining the order. For instance, in a non-limiting example, if the notification module 118 receives two notifications and the prioritization module 120 determines that the notifications are both associated with priority levels of P3, the prioritization module 120 can leverage semantics to determine that a first notification includes a pre-identified word or words such that the prioritization module 120 orders the first notification before the second notification. For example, the first notification can includes words such as "urgent," "important," "necessary," etc. Additional and/or alternative words can be identified for promoting a notification in the order of notifications in the notification module 118.

Figure 2:
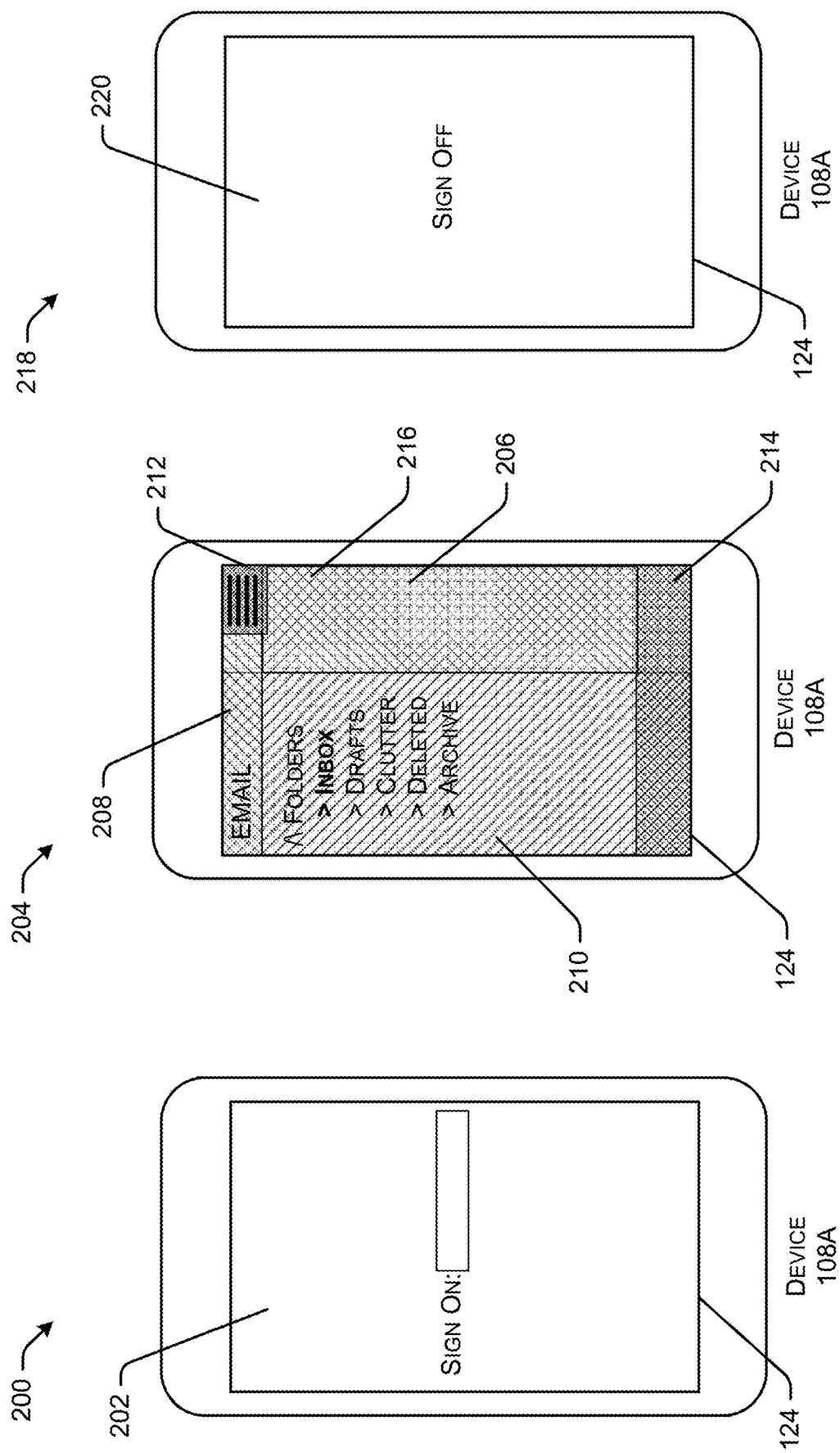
FIG. 2A is a schematic diagram showing an example of a region of a user interface presented via a display of a device.
FIG. 2B is a schematic diagram showing an example of regions of a user interface presented via a display of a device.
FIG. 2C is a schematic diagram showing an example of a region of a user interface presented via a display of a device.

FIGS. 2A-2C illustrate example user interfaces that are partitioned into regions. FIG. 2A is a schematic diagram 200 showing an example of a region 202 of a user interface presented via a display 124 of a device (e.g., device 108A). FIG. 2A can represent a logon user interface and region 202 can be associated with a label such as Region 0. The logon user interface can be divided into any number of regions. The regions can be same or different shapes, occupy same or different areas, correspond to one or many controls on the user interface, etc. In some examples, one or more regions can overlap. The configuration of region 202 is one example of how the regions can be configured and alternative and/or additional configurations can be used. FIG. 2B is a schematic diagram 204 showing an example of regions 206-216 of a user interface presented via a display 124 of a device (e.g., device 108A). FIG. 2B can represent a reading pane or active user interface and regions 206-216 can be associated with labels such as Region 1-Region N-1, respectively. The reading pane can be divided into any number of regions. The regions can be same or different shapes, occupy same or different areas, correspond to one or many controls on the user interface, etc. In some examples, one or more regions can overlap. The configuration of regions 206-216 are one example of how the regions can be configured and alternative and/or additional configurations can be used. FIG. 2C is a schematic diagram 218 showing an example of a region 220 of a user interface presented via a display 124 of a device (e.g., device 108A). FIG. 2C can represent a logout user interface and Region 220 can be associated with a label such as Region N, wherein N is an integer greater than 2. The logout user interface can be divided into any number of regions. The regions can be same or different shapes, occupy same or different areas, correspond to one or many controls on the user interface, etc. In some examples, one or more regions can overlap. The configuration of region 218 is one example of how the regions can be configured and alternative and/or additional configurations can be used.

Table 2 below is a non-limiting example of a plurality of notifications and corresponding regions as indicated in the metadata associated with each of the notifications.

TABLE 2

| Notification Type | Region |
| --- | --- |
| Notification (UserVoice) | R4 |
| Notification (Clutter) | R2 |
| Notification (New Feature) | R5 |
| Notification (SPAM) | R1 |

The presentation module 122 can send notifications to one or more devices 108. In at least one example, the presentation module 122 can be associated with an application programming interface (API) and the API can send the notifications to various areas of one or more applications (e.g., application(s) 128) associated with the devices 108. The presentation module 122 can leverage a presentation policy to determine timing associated with sending the notifications to the one or more devices 108. The presentation policy can include one or more rules specifying a number of notifications that can be sent to the one or more devices 108 within a period of time. In some examples, the period of time can be a day, hour, minute, second, etc. In other examples, the period of time can be associated with a session, an action, etc. A session can be a semi-permanent exchange of information between two or more devices (e.g., devices 108 and server(s) 110) or between a device (e.g., device 108A, device 108B, device 108C, etc.) and a user 106 (e.g., a log-in session). In at least one example, the presentation policy can be associated with data stored in a profile associated with a user 106 in the profile module 116.

The presentation module 122 can also determine whether sending a notification causes a conflict with the presentation policy. If sending a notification causes a conflict with the presentation policy, in some examples, the presentation module 122 can suppress the notification and send the notification after a time delay. The length of the time delay can be based at least in part on predetermined criteria. As described below, the predetermined criteria can be a lapse of a predetermined amount of time, an occurrence of an event, etc. In an alternative example, if sending a notification causes a conflict with the presentation policy, the presentation module 122 can override a presentation policy conflict. For instance, if the notification module 118 includes three notifications that are each associated with a P0 priority level but the presentation policy limits the number of notifications that can be sent in a period of time, the presentation module 122 override the presentation policy and send all three notifications. In other examples, if sending a notification causes a conflict with the presentation policy, the presentation module 122 can prompt the service provider 102 to override a presentation policy conflict. Table 3 below is a non-limiting example of a plurality of notifications arranged in a determined order for sending each of the notifications based at least in part on the prioritization policy and/or the presentation policy.

TABLE 3

| Notification Request | Triggering Event | Priority Level | Region | User Sees |
| --- | --- | --- | --- | --- |
| Notification (UserVoice) | Triggers based on suggestion fixed | P1 | R0 | First |
| Notification (Clutter) | Triggers on startup | P2 | R3 | Delayed next login |
| Notification (New Feature) | Triggers on apps button | P3 | R5 | Delayed next login |
| Notification (SPAM) | Triggers on startup | P2 | R1 | Delayed next login |
| Notification (Clutter Day 2) | Triggers next day | P2 | R3 | Delayed next login |

Example Processes

The processes described in FIGS. 3-7 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
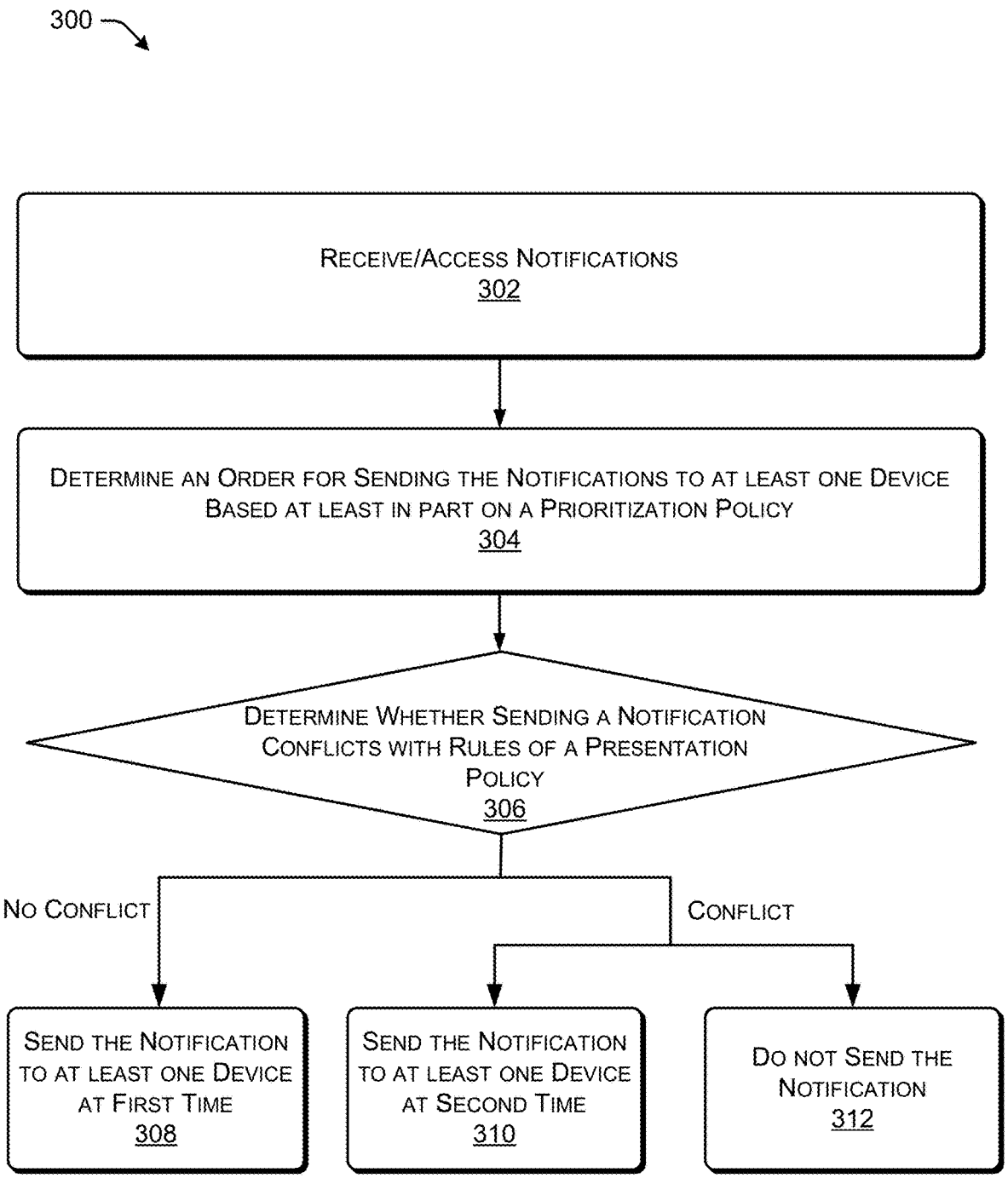
FIG. 3 is a flow diagram that illustrates an example process to determine an order for sending notifications to one or more devices and sending the notifications to the one or more devices pursuant to the determined order and a presentation policy.

FIG. 3 is a flow diagram that illustrates an example process 300 to determine an order for sending notifications to one or more devices 108 and sending the notifications to the one or more devices 108 pursuant to a presentation policy.

Block 302 illustrates receiving and/or accessing notifications. As described above, the notification module 118 can access, receive, and/or create notifications associated with one or more applications (e.g., application(s) 128), service providers (e.g., service provider 102), etc. In at least some examples, the metadata associated with the notifications (e.g., a source of a notification, an identifier indicating content associated with a notification, timing associated with a notification, a position associated with the presentation of a notification, etc.) can be communicated with the notifications from the source of the notifications. The notification module 118 can store the notifications and associated metadata in a queue in an order determined by the prioritization module 120 and/or presentation module 122, described below. In some examples, the metadata and the notifications can be associated with tags or other mechanisms for mapping the metadata to corresponding notifications.

Block 304 illustrates determining an order for sending the notifications to at least one device (e.g., device 108A, device 108B, and/or device 108C) based at least in part on a prioritization policy. The prioritization module 120 can leverage a prioritization policy to determine an order for sending the notifications to one or more devices 108, as described above. The prioritization policy can determine the order for sending the notifications based at least in part on priority levels assigned to the notifications and positions associated with presentations of the notifications. As described above, the positions correspond to regions of a user interface where the notifications are presented.

As described above, the prioritization policy can assign a priority level to an individual notification based at least in part on the metadata indicating a source of the individual notification (e.g., service provider, application, etc.), an identifier identifying content associated with the individual notification, timing associated with the individual notification, etc. The prioritization policy can first consider the priority levels in determining the order for sending the notifications. For instance, in at least one example, notifications associated with priority level P0 can be stored at the top of the queue associated with the notification module 118 and can be the first notifications to be sent to the one or more devices 108. Notifications associated with priority levels P1-PN can be stored subsequent to the P0 level such that, in some examples, notifications associated with priority level P1 can be sent to the one or more devices 108 after the P0 level notifications are sent and notifications associated with priority level P2 can be sent to the one or more devices 108 after the P1 level notifications, etc.

In addition to leveraging the priority levels to determine the order for sending the notifications, the prioritization policy can also consider a position on the user interface where the individual notifications are to be presented. The position can correspond to a region (e.g., Regions 0-N) in the user interface associated with the presentation of each of the individual notifications. The prioritization module 120 can determine a region in a user interface associated with a presentation of each of the individual notifications. To avoid presenting multiple notifications in the same region and/or in neighboring regions successively, the prioritization module 120 can determine the order for sending the notifications to one or more devices 108 based at least in part on the priority level and the region in the user interface associated with the presentation of each of the individual notifications. In some examples, notifications associated with the same priority level can be dispersed throughout the queue associated with the notification module 118 based at least in part on the region of the user interface where individual notifications are to be presented. Table 3, above, is a non-limiting example of said dispersion. That is, notifications associated with the same priority level can be sent to at least one device (e.g., device 108A, device 108B, and/or device 108C) in same periods of time or different periods of time and notifications with lower priority levels can be sent to at least one device (e.g., device 108A, device 108B, and/or device 108C) before notifications with higher priority levels based at least in part on the regions associated with the presentation of the notifications.

In at least one example, the prioritization module 120 can determine that two notifications are associated with a same priority level. The prioritization module 120 can determine that a first notification of the two notifications is associated with a first region in the user interface and that a second notification of the two notifications is associated with a second region in the user interface. The first region and the second region can be the same region or different regions. The prioritization module 120 can determine a spatial relationship between the first region and the second region and can leverage the spatial relationship to determine the order for sending the first notification and the second notification to the one or more devices 108. The spatial relationship can correspond to a value representative of how the first region on the user interface relates to the second region on the user interface. The prioritization module can determine the spatial relationship based on determining a distance between one or more reference points in the first region and one or more corresponding reference points in the second region, a distance between edges of the first region and the second region that are in closest proximity, etc.

In some examples, the prioritization module 120 can determine that the first region is within a threshold distance of the second region. The first region and the second region can be a same region or neighboring regions. As a non-limiting example, the first region and the second region can both be Region 0 or Region 1, or the first region can be Region 0 and the second region can be Region 1. The prioritization module 120 can determine that the first notification and the second notification should be sent to the one or more devices 108 at different times. In some examples, the different times can be during a same period of time or during a different period of time. Accordingly, two notifications that are associated with a priority level of P2 can be sent to at least one device (e.g., device 108A, device 108B, and/or device 108C) at different times and/or in different periods of time, even though both notifications are associated with a same priority level.

In other examples, the prioritization module 120 can determine that the first region is outside of a threshold distance of the second region. As a non-limiting example, the first region can be Region 0 and the second region can be Region 4. The prioritization module 120 can determine that the first notification and the second notification can be sent to the one or more devices 108 at same times and/or within a same period of time. Accordingly, two notifications that are associated with a priority level of P2 can be sent to at least one device (e.g., device 108A, device 108B, and/or device 108C) at a same time and/or within a same period of time because the notifications are not presented in a same or neighboring region.

Block 306 illustrates determining whether sending a notification conflicts with rules of the presentation policy. The presentation module 122 can leverage a presentation policy to determine timing associated with sending the notifications to the one or more devices 108. As described above, the presentation policy can include one or more rules specifying a number of notifications that can be sent to the one or more devices 108 at a same time and/or within a predetermined period of time. In some examples, the predetermined period of time can be a day, hour, minute, second, etc. In other examples, the predetermined period of time can be associated with a session, an action, etc.

The presentation module 122 can access individual notifications in the notification module 118, starting with a top ranked notification in the queue. The presentation module 122 can determine whether sending the top ranked notification violates any rules of the presentation policy. In some examples, if the presentation module 122 has not yet sent the number of notifications allotted for a period of time, sending the top ranked notification may not violate any rule (e.g., no conflict). Accordingly, the presentation module 122 can send the top ranked notification to at least one device (e.g., device 108A, device 108B, and/or device 108C). Block 308 illustrates sending the notification to the at least one device (e.g., device 108A, device 108B, and/or device 108C) at a first time. The first time can be associated with a first period of time (e.g., day, hour, minute, second, session, action, etc.).

In other examples, if the presentation module 122 already sent the number of notifications allotted for a period of time, sending the top ranked notification may violate a rule (e.g., cause a conflict). Accordingly, the presentation module 122 can suppress sending the top ranked notification. The presentation module 122 can leverage the presentation policy to determine if and/or when to send the top ranked notification. In at least one example, the presentation policy can include one or more predetermined criteria for determining an amount of time to delay sending the top ranked notification. As described above, the one or more predetermined criteria can include a lapse of a predetermined amount of time, an occurrence of an event, etc. The lapse of the predetermined amount of time can be associated with a time interval (e.g., a predetermined number of seconds, minutes, etc.), sessions, actions, etc. The occurrence of an event can correspond to some interaction between a user 106 and a device (e.g., device 108A, device 108B, or device 108C). As non-limiting examples, events can include startup of a session, activation of an application 128, completion of a repair, change of user tasks, etc.

In some examples, an occurrence of an event can be based at least in part on detecting interaction between a user 106 and a user interface presented via a display 124 of a device (e.g., device 108A, device 108B, or device 108C). As a non-limiting example, a user 106 can be interacting with an e-mail application on a device (e.g., device 108A, device 108B, or device 108C), as illustrated in FIG. 2B. A user 106 can be scrolling through folders and can select one of the folders (e.g., INBOX) by some interaction with the user interface (e.g., actuation of a control via a mouse, a pen, a touch input, a sensor input, etc.). Based at least in part on selecting the INBOX folder, the user 106 can view e-mails in the user's inbox. When the user 106 is finished viewing his or her e-mails in the user's inbox, the user 106 can interact with a different folder and/or region in the user interface (e.g., actuation of a control via a mouse, a pen, a touch input, a sensor input, etc.). The one or more server(s) 110 can detect the interaction with a different folder and/or region and, accordingly, can trigger sending a notification for presentation of the notification in the reading pane where the user's 106 e-mails are or were previously presented (e.g., region 216).

Block 310 illustrates sending the notification to the at least one device (e.g., device 108A, device 108B, and/or device 108C) at a second time. The at least one device (e.g., device 108A, device 108B, and/or device 108C) can be a same at least one device (e.g., device 108A, device 108B, and/or device 108C) or a different at least one device (e.g., device 108A, device 108B, and/or device 108C) than the first notification was sent. As described above, if the presentation module 122 already sent the number of notifications allotted for a period of time, sending the top ranked notification can violate a rule (e.g., conflict). Accordingly, the presentation module 122 can suppress sending the top ranked notification and can leverage the presentation policy to determine if and/or when to send the top ranked notification. The presentation module 122 can determine to send the top ranked notification at a second time based at least in part on the one or more predetermined criteria described above. That is, the presentation module 122 can send the top ranked notification after a lapse of a predetermined amount of time or an occurrence of an event.

In some examples, the top ranked notification can be associated with expiration metadata indicating a period of time after which the top ranked notification expires. If, after the lapse of the predetermined amount of time or the occurrence of the event, the top ranked notification has expired, the presentation module 122 can refrain from sending the top ranked notification. Block 312 illustrates refraining from sending the notification to the at least one device (e.g., device 108A, device 108B, and/or device 108C).

Figure 4:
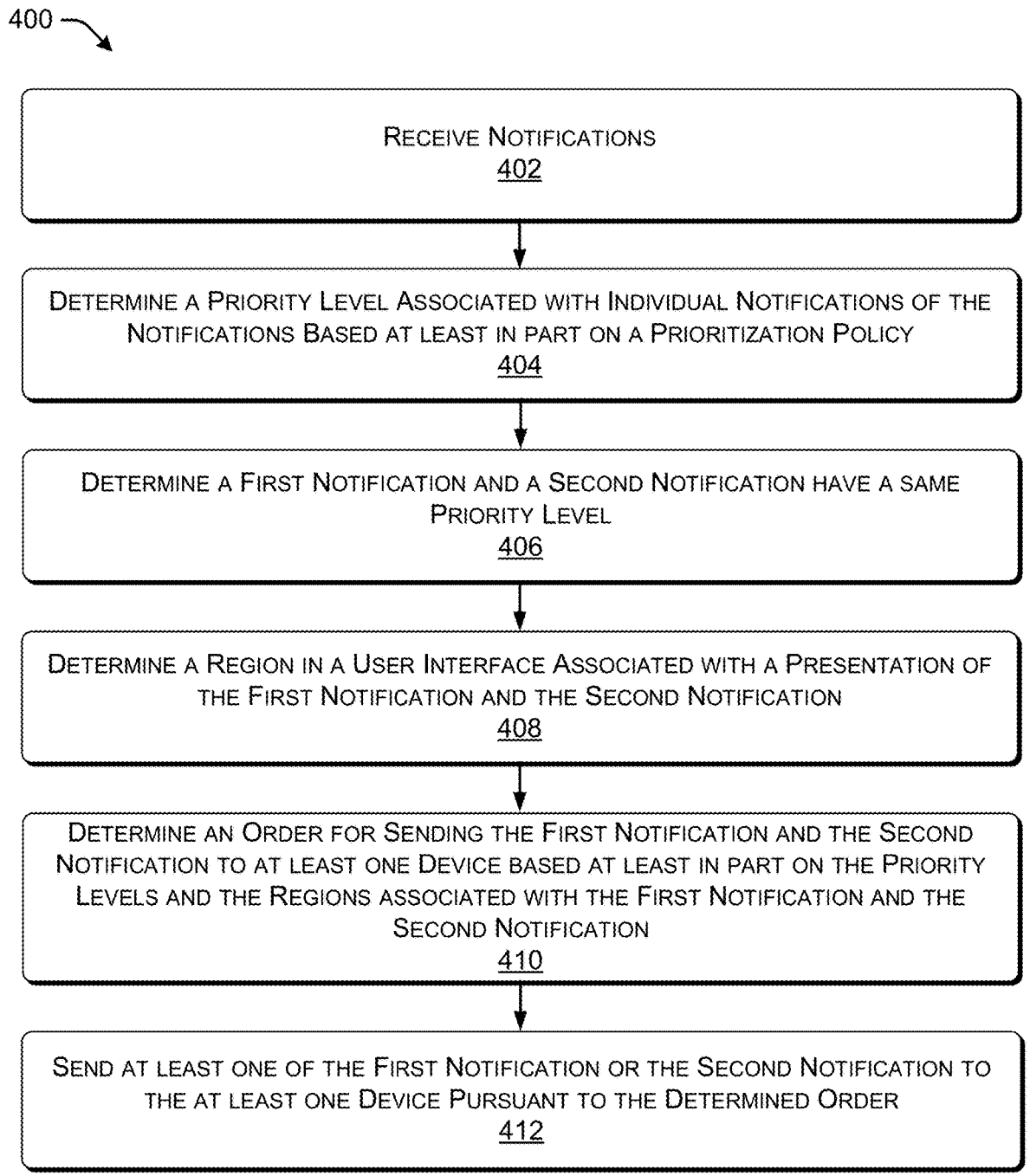
FIG. 4 is a flow diagram that illustrates an example process to determine an order for sending notifications to one or more devices and sending the notifications to the one or more devices pursuant to the determined order.

FIG. 4 is a flow diagram that illustrates an example process 400 to determine an order for sending notifications to one or more devices 108 and sending the notifications to the one or more devices 108 pursuant to a determined order.

Block 402 illustrates receiving notifications. As described above, the notification module 118 can access, receive, and/or create notifications associated with one or more applications (e.g., application(s) 128), service providers (e.g., service provider 102), websites, etc.

Block 404 illustrates determining a priority level associated with individual notifications of the notifications based at least in part on a prioritization policy. In at least one example, the prioritization module 120 can determine an identifier associated with individual notifications and can assign priority levels to the individual notifications based at least in part on the identifier associated with the individual notification, as described above.

Block 406 illustrates determining that a first notification and a second notification have a same priority level. As described above, in at least one example, the prioritization module 120 can determine that the first notification and the second notification are associated with a same priority level.

Block 408 illustrates determining a region in a user interface associated with a presentation of the first notification and the second notification. The prioritization module 120 can determine that the first notification is associated with a first region in the user interface and that the second notification is associated with a second region in the user interface. The first region and the second region can be the same region or different regions. The prioritization module 120 can determine a spatial relationship between the first region and the second region.

Block 410 illustrates determining an order for sending the first notification and the second notification to at least one device (e.g., device 108A, device 108B, and/or device 108C) based at least in part on the priority levels and the regions associated with the first notification and the second notification. As described above, the prioritization module 120 can first consider the priority levels associated with the first notification and second notification. Then, the prioritization module 120 can utilize the spatial relationship between the first region and the second region to determine the order for sending the first notification and the second notification to the at least one device (e.g., device 108A, device 108B, and/or device 108C), as described above.

Block 412 illustrates sending at least one of the first notification or the second notification to the at least one device (e.g., device 108A, device 108B, and/or device 108C) pursuant to the determined order. The presentation module 122 can access individual notifications in the queue associated with the notification module 118, starting with the top ranked one or more notifications in the queue (e.g., the first notification and/or the second notification). The presentation module 122 can determine whether sending the top ranked one or more notifications violates any rules of the presentation policy. In some examples, if the presentation module 122 has not yet sent the number of notifications allotted for a period of time, sending the top ranked one or more notifications may not violate any rule and the presentation module 122 can send the top ranked one or more notifications to the at least one device (e.g., device 108A, device 108B, and/or device 108C). In other examples, if the presentation module 122 already sent the number of notifications allotted for a period of time, sending the top ranked one or more notifications may violate a rule of the presentation policy. Accordingly, the presentation module 122 can suppress sending the top ranked one or more notifications. The presentation module 122 can leverage the presentation policy to determine if and/or when to send the top ranked notification. In at least one example, the presentation policy can include one or more predetermined criteria for determining an amount of time to delay sending the top ranked notification. Based at least in part on satisfying the rules and/or one or more predetermined criteria of the presentation policy, the presentation module 122 can send the notifications to the at least one device (e.g., device 108A, device 108B, and/or device 108C) pursuant to the order determined by the prioritization module 120.

Figure 5:
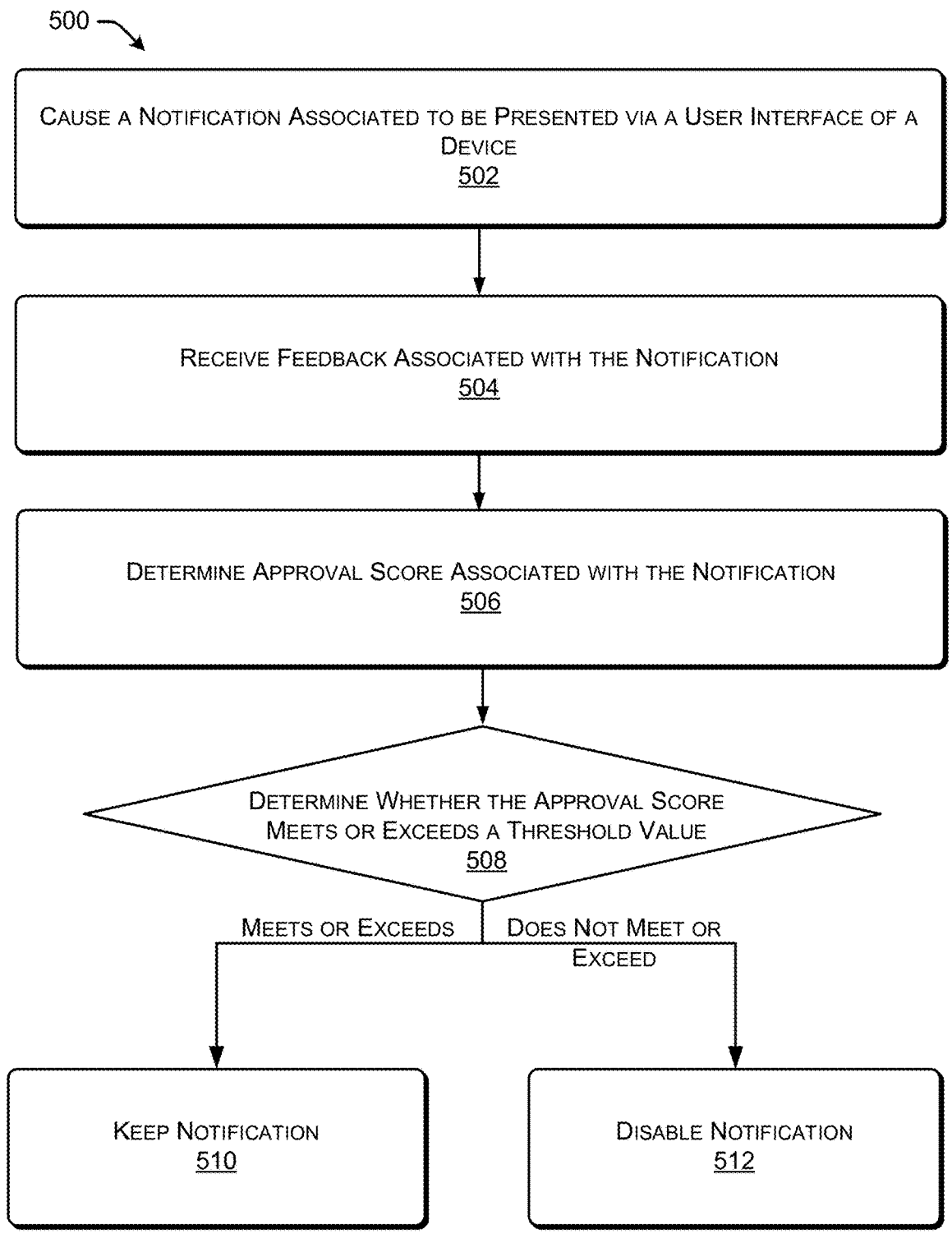
FIG. 5 is a flow diagram that illustrates an example process to determine user approval of a notification based at least in part on user feedback.

FIG. 5 is a flow diagram that illustrates an example process 500 to determine user approval of a notification based at least in part on user feedback.

Block 502 illustrates causing a notification to be presented via a user interface of at least one device (e.g., device 108A, device 108B, and/or device 108C). As described above, the presentation module 122 sends the notification to at least one device (e.g., device 108A, device 108B, and/or device 108C). The notification can be presented on the display 124 of the at least one device (e.g., device 108A, device 108B, and/or device 108C). As described above, notifications can include a data packet including text to be communicated to one or more users 106 and a function for the one or more users 106 to interact with the notification. As a non-limiting example, the function can include a control to be presented on the user interface to provide functionality for a user 106 to rate or dismiss the notification.

Block 504 illustrates receiving feedback associated with the notification. As described above, notifications can include a data packet including text to be communicated to one or more users 106 and a function for the one or more users 106 to interact with the notification. As a non-limiting example, the function can include a control to be presented on the user interface to provide functionality for a user 106 to rate or dismiss the notification. A user 106 can interact with the at least one device (e.g., device 108A, device 108B, and/or device 108C). For instance, the user 106 can interact with a sliding scale, a multiple choice question, a Likert question, a drop down menu, or other mechanisms to indicate that he or she likes or dislikes the notification.

Block 506 illustrates determining an approval score associated with the notification. Based at least in part on receiving feedback, the notification module 118 can access the feedback associated with a plurality of users to determine an approval score from the feedback. In at least one example, the approval score can be an average of favorable ratings in view of all ratings received, a median rating determined from all ratings received, etc.

Block 508 illustrates determining whether the approval score meets or exceeds a threshold value. In at least one example, individual notifications can be associated with a threshold value. The threshold value can represent a threshold approval score, a percentage, etc. The notification module 118 can compare the approval score associated with the notification with the threshold value. If the approval score meets or exceeds a threshold value, the notification module 118 can continue to send the notification to other devices 108 (e.g., associated with other profiles). Block 510 illustrates keeping the notification in the queue associated with the notification module 120. If the approval score does not meet or exceed the threshold value, the notification module 118 can disable the notification. Block 512 illustrates disabling the notification. In at least one example, based at least in part on the notification module 118 determining that the approval score associated with the notification does not meet or exceed the threshold value, a revert action workflow can begin to disable the notification for future presentation.

Figure 6:
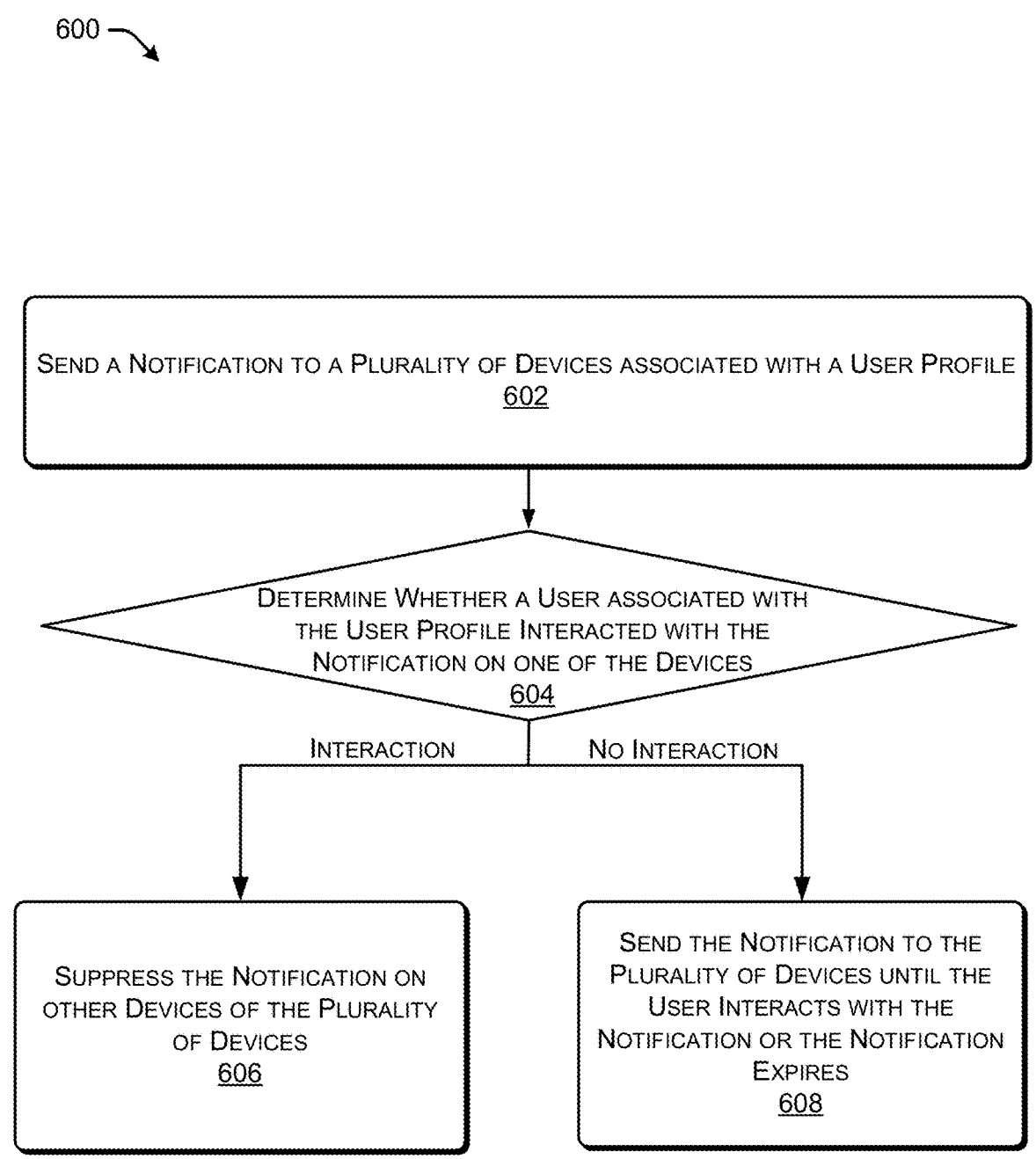
FIG. 6 is a flow diagram that illustrates an example process to suppress sending a notification to one or more devices associated with a profile based at least in part on user interaction with the notification via at least one device associated with the profile.

FIG. 6 is a flow diagram that illustrates an example process 600 to suppress sending a notification to one or more devices 108 associated with a profile based at least in part on user interaction with the notification via at least one device (e.g., device 108A, device 108B, and/or device 108C) associated with the profile.

Block 602 illustrates sending a notification to a plurality of devices 108 associated with a profile. As described above, the presentation module 122 can send a notification to one or more devices 108 associated with a profile. In the context of FIG. 1, the plurality of devices can include device 108A, 108B, and 108C.

Block 604 illustrates determining whether a user 106 associated with the profile interacted with the notification on at least one of the devices (e.g., device 108A, device 108B, and/or device 108C). The presentation module 122 can determine whether a user 106 associated with the profile interacted with the notification, for example, by rating the notification, dismiss the notification, etc. on at least one of the devices (e.g., device 108A, device 108B, and/or device 108C). In the context of FIG. 1, the user 106 can interact with the notification via any one or more of devices 108A, 108B, and/or 108C. As a non-limiting example, the presentation module 122 can determine that the user 106 interacted with device 108A.

Block 606 illustrates suppressing the notification on other devices of the plurality of devices 108. Based at least in part on determining that the user 106 interacted with the notification via at least one of the devices (e.g., device 108A, device 108B, and/or device 108C), the presentation module 122 can suppress the notification on the other devices of the plurality of devices 108 to prevent the user 106 from receiving the same notification on all devices 108 associated with the user's 106 profile. In the non-limiting example above, in the context of FIG. 1, the presentation module 122 can suppress the notification on devices 108B and 108C.

In the absence of user interaction with at least one of the devices (e.g., device 108A, device 108B, and/or device 108C) in the plurality of devices 108, the presentation module 122 can continue to send the notification to all of the devices in the plurality of devices until the user 106 interacts with the notification or the notification expires. Block 608 illustrates sending the notification to the other devices of the plurality of devices 108 until the user 106 interacts with the notification or the notification expires.

Figure 7:
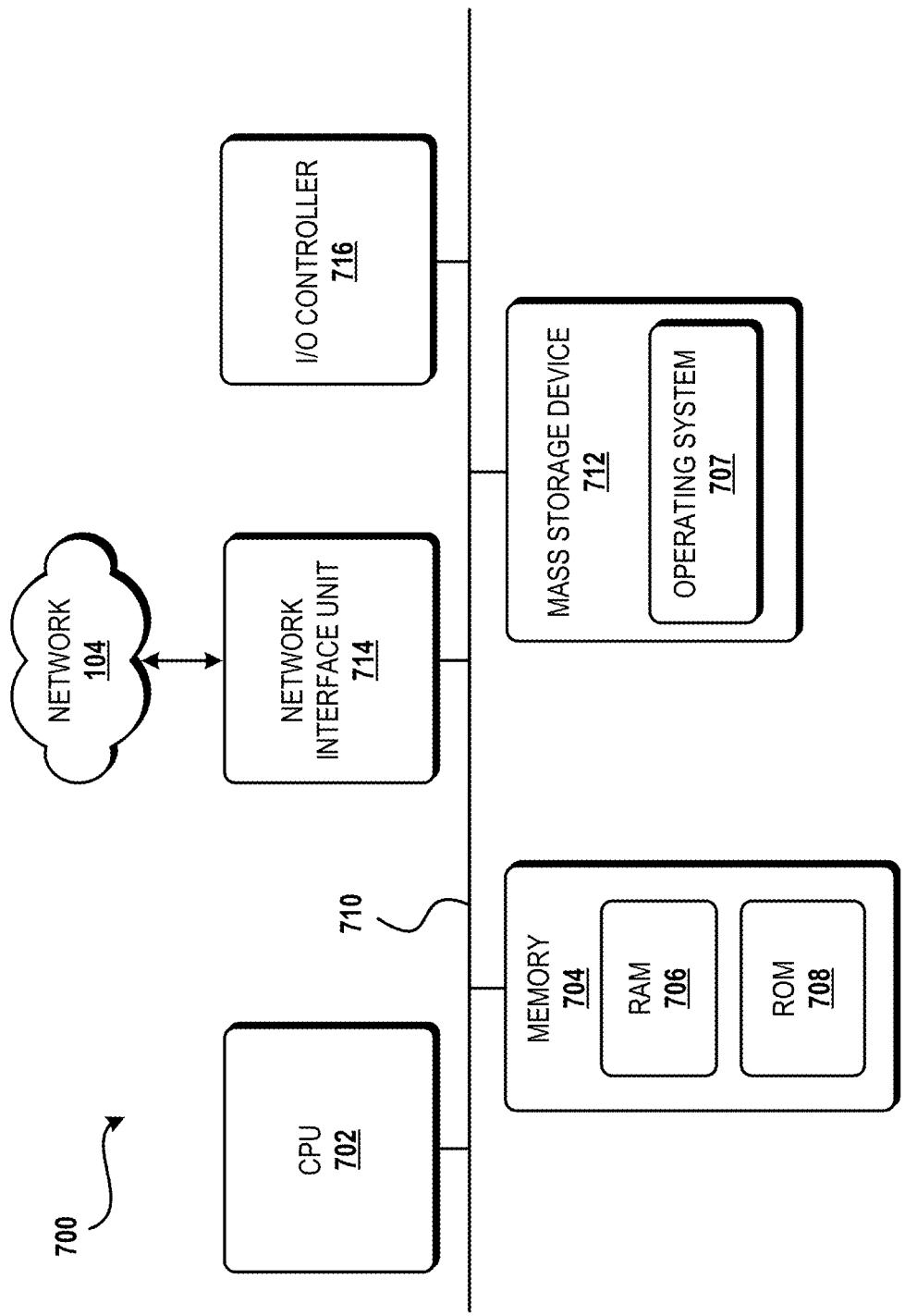
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as device 108A, device 108B, device 108C, and/or server(s) 110 (FIG. 1), capable of executing the program components described above for controlling notifications based at least in part on the importance of the notifications to users. Thus, the computer architecture 700 illustrated in FIG. 7 illustrates an architecture for a server computer, mobile phone, a PDA, a smart phone, a desktop computer, a netbook computer, a tablet computer, and/or a laptop computer. The computer architecture 700 can be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 706. The computer architecture 700 further includes a mass storage device 712 for storing an operating system 707, and one or more application programs, etc.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 can operate in a networked environment using logical connections to remote computers through the network 104 and/or another network (not shown). The computer architecture 700 can connect to the network 104 through a network interface unit 714 connected to the bus 710. It should be appreciated that the network interface unit 714 also can be utilized to connect to other types of networks and remote computer systems. The computer architecture 700 also can include an input/output controller 716 for receiving and processing input from a number of other devices, including a keyboard, mouse, or electronic stylus (not shown in FIG. 7). Similarly, the input/output controller 716 can provide output to a display screen, a printer, or other type of output device (also not shown in FIG. 7).

It should be appreciated that the software components described herein can, when loaded into the CPU 702 and executed, transform the CPU 702 and the overall computer architecture 700 from a general-purpose computing system into a special-purpose computing system customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 can include other types of computing entities, including hand-held computers, embedded computer systems, personal digital assistants, and other types of computing entities known to those skilled in the art. It is also contemplated that the computer architecture 700 may not include all of the components shown in FIG. 7, can include other components that are not explicitly shown in FIG. 7, or can utilize an architecture completely different than that shown in FIG. 7.

Figure 8:
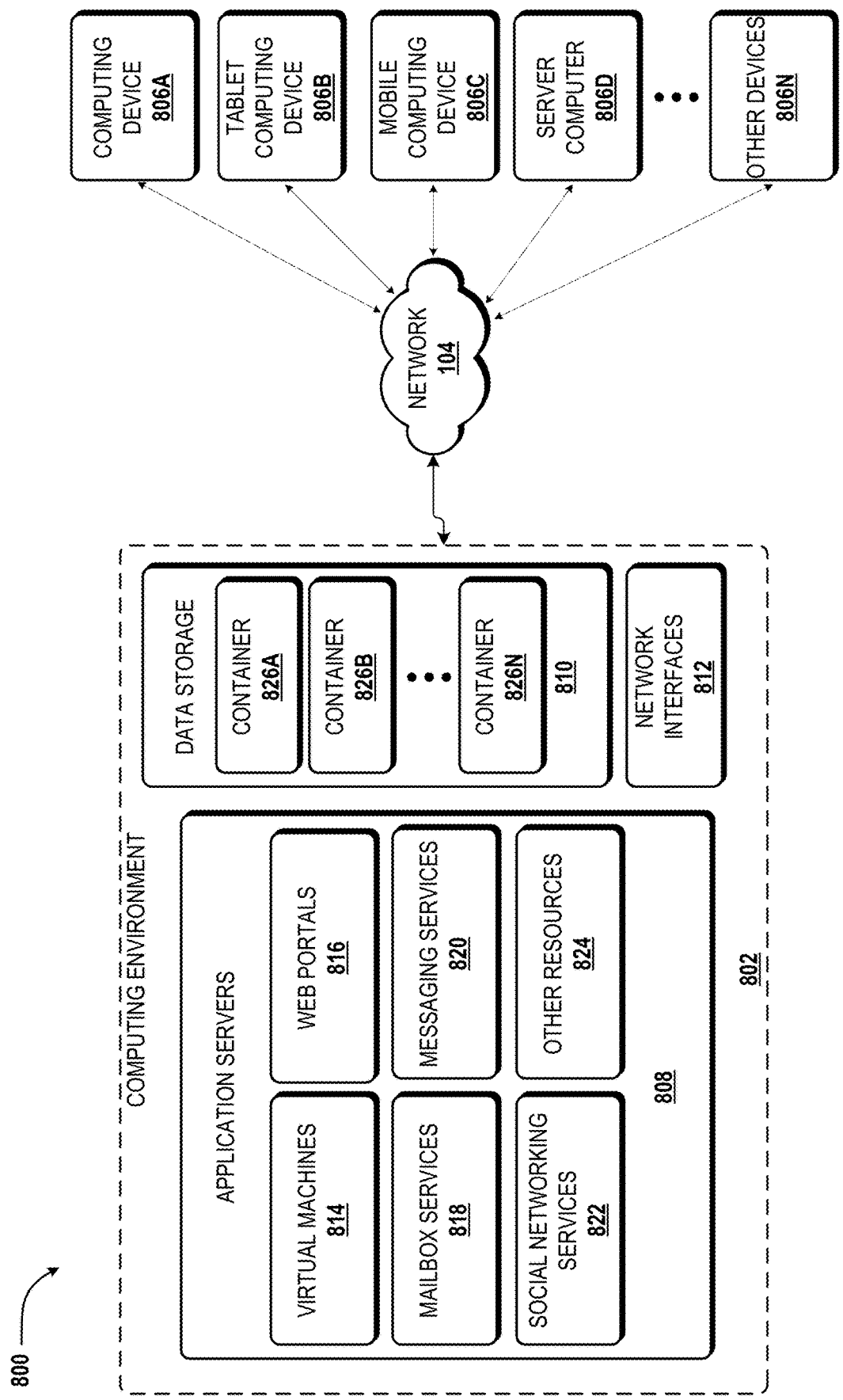
FIG. 8 is a diagram illustrating a distributed computing environment capable of implementing aspects of the techniques and technologies presented herein.

FIG. 8 depicts an illustrative distributed computing environment 800 capable of executing the software components described herein for controlling notifications based at least in part on the importance of the notifications to users. Thus, the distributed computing environment 800 illustrated in FIG. 8 can be utilized to execute any aspects of the software components presented herein. For example, the distributed computing environment 800 can be utilized to execute aspects of the techniques described herein.

According to various implementations, the distributed computing environment 800 includes a computing environment 802 operating on, in communication with, or as part of the network 104. In at least one example, at least some of computing environment 802 can correspond to the one or more server(s) 110. The network 104 can be or can include the network 104, described above with reference to FIG. 7. The network 104 also can include various access networks. One or more client devices 806A-806N (hereinafter referred to collectively and/or generically as "clients 806") can communicate with the computing environment 802 via the network 104 and/or other connections (not illustrated in FIG. 8). The client devices 806A-806N can correspond to any of devices 108 in FIG. 1. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. Two example computing architectures for the clients 806 are illustrated and described herein with reference to FIGS. 7 and 8. It should be understood that the illustrated clients 806 and computing architectures illustrated and described herein are illustrative, and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 104. The computing environment 802 can correspond to the one or more server(s) 110 in FIG. 1. The application servers 808 can host various services, virtual machines, portals, and/or other resources. In the illustrated configuration, the application servers 808 can host one or more virtual machines for executing applications or other functionality. According to various implementations, the virtual machines can execute one or more applications and/or software modules for controlling notifications based at least in part on the importance of the notifications to users. It should be understood that this configuration is illustrative, and should not be construed as being limiting in any way. The application servers 808 also host or provide access to one or more portals, link pages, Web sites, and/or other information ("Web portals") 816. The Web portals 816 can be used to communicate with one or more client computers.

According to various implementations, the application servers 808 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging services, chat services, forum services, and/or other communication services.

The application servers 808 also may include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 822 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the above configurations are illustrative, and should not be construed as being limited in any way. According to various implementations, the social networking services 822 may host one or more applications and/or software modules for providing the functionality described herein for providing contextually-aware location sharing services for computing devices. For instance, any one of the application servers 808 may communicate or facilitate the functionality and features described herein. For instance, a social networking application, mail client, messaging client, a browser running on a phone or any other client 806 may communicate with a networking service 822.

As shown in FIG. 8, the application servers 808 also can host other services, applications, portals, and/or other resources ("other resources") 824. The other resources 824 can deploy a service-oriented architecture or any other client-server management software. It thus can be appreciated that the computing environment 802 can provide integration of the concepts and technologies disclosed herein provided herein with various mailbox, messaging, social networking, and/or other services or resources. In at least one example, any of the mailbox, messaging, social networking, and/or other services or resources can send notifications to the notification module 118.

As mentioned above, the computing environment 802 can include the data storage 810. According to various implementations, the functionality of the data storage 810 is provided by one or more databases operating on, or in communication with, the network 104. The functionality of the data storage 810 also can be provided by one or more server computers configured to host data for the computing environment 802. The data storage 810 can include, host, or provide one or more real or virtual containers 826A-826N (hereinafter referred to collectively and/or generically as "containers 826"). Although not illustrated in FIG. 8, the containers 826 also can host or store data structures and/or algorithms for execution by a module, such as the program module 112A, etc. Aspects of the containers 826 can be associated with a database program, file system and/or any program that stores data with secure access features. Aspects of the containers 826 can also be implemented using products or services, such as ACTIVE DIRECTORY, DKM, ONEDRIVE, DROPBOX or GOOGLEDRIVE.

The computing environment 802 can communicate with, or be accessed by, the network interfaces 812. The network interfaces 812 can include various types of network hardware and software for supporting communications between two or more computing entities including, but not limited to, the clients 806 and the application servers 808. It should be appreciated that the network interfaces 812 also can be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the clients 806. It should be understood that the clients 806 can include real or virtual machines including, but not limited to, server computers, web servers, personal computers, mobile computing entities, smart phones, and/or other devices. As such, various configurations of the concepts and technologies disclosed herein enable any device configured to access the distributed computing environment 800 to utilize the functionality described herein for controlling notifications based at least in part on the importance of the notifications to users, among other aspects. In one specific example, as summarized above, techniques described herein can be implemented, at least in part, by a web browser application that can work in conjunction with the application servers 808 of FIG. 8.

Figure 9:
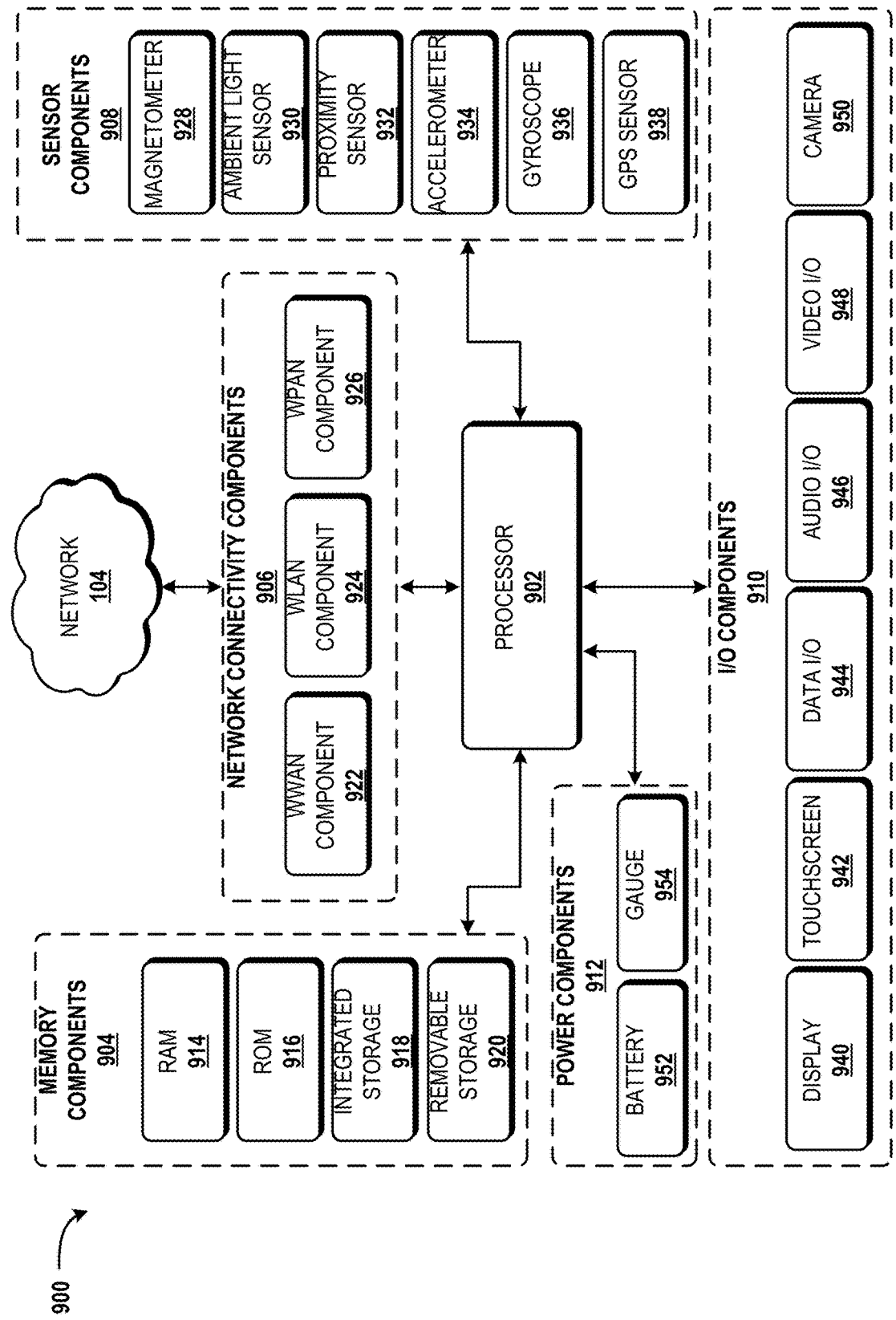
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components described herein for controlling notifications based at least in part on the importance of the notifications to users. The computing device architecture 900 is applicable to computing entities that facilitate mobile computing due, in part, to form factor, wireless connectivity, and/or battery-powered operation. In some configurations, the computing entities include, but are not limited to, mobile telephones, tablet devices, slate devices, portable video game devices, and the like. The computing device architecture 900 is applicable to any of the clients 806 shown in FIG. 8 (e.g., device 108A, device 108B, device 108C, etc.). Moreover, aspects of the computing device architecture 900 can be applicable to traditional desktop computers, portable computers (e.g., laptops, notebooks, ultra-portables, and netbooks), server computers, and other computer systems, such as described herein with reference to FIG. 8 (e.g., servers (110)). For example, the single touch and multi-touch aspects disclosed herein below can be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 920P, 1080P, and higher resolution), video games, three-dimensional ("3D") modeling applications, and the like. In some configurations, the processor 902 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein also can be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 104 or another network, which can be a WWAN, a WLAN, or a WPAN. Although only the network 104 is illustrated, the network connectivity components 906 can facilitate simultaneous communication with multiple networks, including the network 104 of FIG. 9. For example, the network connectivity components 906 can facilitate simultaneous communications with multiple networks via one or more of a WWAN, a WLAN, or a WPAN.

The network 104 can be or can include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 104 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 can be configured to provide voice and/or data communications with any combination of the above technologies. The network 104 can be configured to or adapted to provide voice and/or data communications in accordance with future generation technologies.

In some configurations, the WWAN component 922 is configured to provide dual-multi-mode connectivity to the network 104. For example, the WWAN component 922 can be configured to provide connectivity to the network 104, wherein the network 104 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 104 can be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 104 via the WI-FI access points. Such connections can be secured via various encryption technologies including, but not limited, WI-FI Protected Access ("WPA"), WPA2, Wired Equivalent Privacy ("WEP"), and the like.

The network 104 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing entities via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also can be incorporated in the computing device architecture 900.

The magnetometer 928 is configured to measure the strength and direction of a magnetic field. In some configurations the magnetometer 928 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object or thing in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 928 are contemplated.

The accelerometer 934 is configured to measure proper acceleration. In some configurations, output from the accelerometer 934 is used by an application program as an input mechanism to control some functionality of the application program. For example, the application program can be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 can be used by any application program that requires or benefits from location information. For example, the location calculated by the GPS sensor 938 can be used with a navigation application program to provide directions from the location to a destination or directions from the destination to the location. Moreover, the GPS sensor 938 can be used to provide location information to an external location-based service, such as E911 service. The GPS sensor 938 can obtain location information generated via WI-FI, WIMAX, and/or cellular triangulation techniques utilizing one or more of the network connectivity components 906 to aid the GPS sensor 938 in obtaining a location fix. The GPS sensor 938 can also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 can include discrete processors configured to support the various interface described below, or can include processing functionality built-in to the processor 902.

The display 940 is an output device configured to present information in a visual form. In particular, the display 940 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device can have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 942. As such, a developer can create gestures that are specific to a particular application program.

In some configurations, the touchscreen 942 supports a tap gesture in which a user taps the touchscreen 942 once on an item presented on the display 940. The tap gesture can be used for various reasons including, but not limited to, opening or launching whatever the user taps. In some configurations, the touchscreen 942 supports a double tap gesture in which a user taps the touchscreen 942 twice on an item presented on the display 940. The double tap gesture can be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture can be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture can be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture can be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture can be used for various reasons including, but not limited to, zooming gradually in or out of a website, map, or picture.

Although the above gestures have been described with reference to the use one or more fingers for performing the gestures, other appendages such as toes or objects such as styluses can be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 can utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 can be implemented as hardware or software buttons.

Although not illustrated, one or more hardware buttons can also be included in the computing device architecture 900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 952, which can be connected to a battery gauge 954. The batteries 952 can be rechargeable or disposable. Rechargeable battery types include, but are not limited to, lithium polymer, lithium ion, nickel cadmium, and nickel metal hydride. Each of the batteries 952 can be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector, which can be combined with one or more of the aforementioned I/O components 910. The power components 912 can interface with an external power system or charging equipment via a power I/O component.

The disclosure presented herein can be considered in view of the following clauses.

A. A system comprising one or more processors; memory; one or more modules stored in the memory and executable by the one or more processors to perform operations comprising: receiving notifications associated with a profile corresponding to one or more devices; determining an order for sending the notifications to the one or more devices based at least in part on priority levels assigned to the notifications and positions associated with presentations of the notifications, wherein the positions correspond to regions of a user interface; sending a first notification of the notifications to at least one device of the one or more devices in a first period of time; determining that sending a second notification of the notifications exceeds a predetermined number of notifications to be sent to the one or more devices in the first period of time; determining a second period of time subsequent to the first period of time to send the second notification to the at least one device based at least in part on at least one of a lapse of a predetermined amount of time or an occurrence of an event; and sending the second notification to the at least one device in the second period of time.

B. The system as paragraph A recites wherein, a prioritization policy assigns a priority level of the priority levels to an individual notification of the notifications based at least in part on one or more of a source of the individual notification, an identifier associated with the individual notification, or a timing associated with the individual notification.

C. The system as paragraph B recites wherein, the identifier associated with the individual notification comprises an indication that the notification includes content that is associated with security, compliance, an update, or a new feature.

D. The system as paragraph C recites wherein, the prioritization policy assigns a highest priority level to notifications that are at least one of expressly requested by the profile or associated with security or compliance content, and assigns successively lower priority levels to notifications including content associated with an update or a new feature, respectively.

E. The system as any of paragraphs A-D recite wherein, determining the order for sending the notifications is based at least in part on operations further comprising: accessing a third notification of the notifications; determining that the first notification and the third notification and are associated with a same priority level; determining that the first notification is associated with a first position of the positions, the first position corresponding to a first region of the regions of the user interface; determining that the third notification is associated with a second position of the positions, the second position corresponding to the first region or a second region of the regions of the user interface, wherein the second region is within a threshold distance of the first region; and sending the third notification to the at least one device in a third period of time that is subsequent to the first period of time.

F. The system as any of paragraphs A-E recite, wherein determining the order for sending the notifications is based at least in part on operations further comprising: accessing a third notification of the notifications; determining that the first notification and the third notification and are associated with a same priority level; determining that the first notification is associated with a first position of the positions corresponding to a first region of the regions of the user interface; determining that the third notification is associated with a second position of the positions corresponding to the a second region of the regions of the user interface, wherein the second region is a threshold distance away from the first region; and sending the third notification to the at least one device during the first period of time.

G. The system as any of paragraphs A-F recite, wherein the first period of time corresponds to a first session and the second period of time corresponds to a second session.

H. The system as any of paragraphs A-G recite, wherein: the profile corresponds to at least two devices of the one or more devices; and the operations further comprise: based at least in part on sending the first notification to the at least one device, determining that a user associated with the profile interacted with the first notification; and based at least in part on determining that the user associated with the profile interacted with the first notification, suppressing sending the first notification to other devices of the at least two devices.

I. A method comprising: accessing individual notifications of a plurality of notifications from a queue storing the plurality of notifications; determining an identifier associated with each of the individual notifications; determining a region in a user interface associated with a presentation of each of the individual notifications; determining an order for sending each of the individual notifications to a device associated with the profile, wherein determining the order is based at least in part on the identifier and the region in the user interface associated with the presentation of each of the individual notifications; determining a number of the individual notifications to be sent to the profile in a period of time; sending the number of the individual notifications to the device based at least in part on the order; and sending one or more subsequent notifications to the device in one or more subsequent periods of time that are determined based at least in part on predetermined criteria.

J. A method as paragraph I recites, further comprising: accessing a first individual notification of the individual notifications; accessing a second individual notification of the individual notifications; determining that the first individual notification and the second individual notification have a same priority level; determining that the first individual notification is associated with a first region in the user interface; determining that the second individual notification is associated with a second region in the user interface; determining a spatial relationship between the first region and the second region; and sending the first notification and the second notification to the device based at least in part on the spatial relationship.

K. A method as paragraph J recites, further comprising: determining that the first region is within a threshold distance of the second region; sending the first notification at a first time associated with the period of time; and sending the second notification at a second time associated with a subsequent period of time of the one or more subsequent period of time.

L. A method as paragraph J recites, further comprising: determining that the first region is a threshold distance away from the second region; sending the first notification and the second notification within a same period of time.

M. A method any of paragraphs I-L recite, wherein the predetermined criteria includes at least one of a lapse of a predetermined amount of time or an occurrence of an event.

N. A method as paragraph M recites, further comprising determining the occurrence of the event based at least in part on detecting user interaction with the user interface.

O. One or more computer-readable media encoded with instructions that, when executed by a processor, configure a computer to perform a method as any of paragraphs I-N recite.

P. A device comprising one or more processors and one or more computer readable media encoded with instructions that, when executed by the one or more processors, configure a computer to perform a computer-implemented method as recited in any of paragraphs I-N.

Q. A method comprising: means for accessing individual notifications of a plurality of notifications from a queue storing the plurality of notifications; means for determining an identifier associated with each of the individual notifications; means for determining a region in a user interface associated with a presentation of each of the individual notifications; means for determining an order for sending each of the individual notifications to a device associated with the profile, wherein determining the order is based at least in part on the identifier and the region in the user interface associated with the presentation of each of the individual notifications; means for determining a number of the individual notifications to be sent to the profile in a period of time; means for sending the number of the individual notifications to the device based at least in part on the order; and means for sending one or more subsequent notifications to the device in one or more subsequent periods of time that are determined based at least in part on predetermined criteria.

R. A method as paragraph Q recites, further comprising: means for accessing a first individual notification of the individual notifications; means for accessing a second individual notification of the individual notifications; means for determining that the first individual notification and the second individual notification have a same priority level; means for determining that the first individual notification is associated with a first region in the user interface; means for determining that the second individual notification is associated with a second region in the user interface; means for determining a spatial relationship between the first region and the second region; and means for sending the first notification and the second notification to the device based at least in part on the spatial relationship.

S. A method as paragraph R recites, further comprising: means for determining that the first region is within a threshold distance of the second region; means for sending the first notification at a first time associated with the period of time; and means for sending the second notification at a second time associated with a subsequent period of time of the one or more subsequent period of time.

T. A method as paragraph R recites, further comprising: means for determining that the first region is a threshold distance away from the second region; and means for sending the first notification and the second notification within a same period of time.

U. A method any of paragraphs Q-T recite, wherein the predetermined criteria includes at least one of a lapse of a predetermined amount of time or an occurrence of an event.

V. A method as paragraph U recites, further comprising means for determining the occurrence of the event based at least in part on detecting user interaction with the user interface.

W. A device comprising: one or more processors; memory; one or more modules stored in the memory and executable by the one or more processors to perform operations comprising: accessing notifications associated with a profile; assigning a priority level to individual notifications of the notifications based at least in part on an identifier associated with the individual notifications; ranking the individual notifications based at least in part on the priority level and a position associated with the individual notifications corresponding to a region of a user interface where the individual notifications are to be presented; sending a first individual notification of the individual notifications to a user device associated with the profile, wherein the first individual notification is associated with a first priority level; and sending a second individual notification of the individual notifications to the user device at a time subsequent to sending the first individual notification, wherein the second individual notification is associated with at least one of: a second priority level that is a lower priority than the first priority level; or a first position that is associated with a region of the user interface that is a same region corresponding to a second position that is associated with the first individual notification or within a threshold distance of the second position.

X. A device as paragraph W recites, wherein the individual notifications each include a data packet including text providing a notice of an event and a function for interacting with the individual notifications.

Y. A device as paragraph X recites, wherein the operations further comprise: receiving feedback associated with the first individual notification; determining approval scores associated with the first individual notification; determining that a first approval score associated with the at least one of the first individual notification is less than a threshold value; and initiating a workflow to disable the first individual notification.

Z. A device as any of paragraphs W-Y recite, wherein the operations further comprise: accessing a third individual notification of the individual notifications; determining that the third individual notification is associated with a third priority level that is a lower priority than the first priority level; suppressing the third individual notification; determining expiration metadata associated with the third individual notification; and based at least in part on determining that the third individual notification is not expired, sending the third individual notification to the user device associated with the profile based at least in part on a lapse of time or occurrence of an event.

AA. A device as any of paragraphs W-Z recite, wherein the operations further comprise: accessing a third individual notification of the individual notifications; determining that the third individual notification is associated with a third priority level that is a lower priority than the first priority level; suppressing the third individual notification; determining expiration metadata associated with the third individual notification; and based at least in part on determining that the third individual notification expired, disabling the third individual notification.

AB. A device as any of paragraphs W-AB recite, wherein: the profile is associated with a plurality of user devices; and the operations further comprise: based at least in part on sending the first individual notification to the user device, determining that a user associated with the profile interacted with the first individual notification; and suppressing sending the first individual notification to other user devices of the plurality of user devices.

CONCLUSION

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system comprising:
one or more processors; and
memory;
the one or more processors configured to execute instructions stored in the memory to perform operations comprising:
receiving a plurality of notifications associated with a profile corresponding to one or more devices;
determining an order for sending the plurality of notifications to the one or more devices based at least in part on a priority level assigned to each of the plurality of notifications;
determining, for each of the plurality of notifications, a position associated with presentation of each of the plurality of notifications within a user interface displayed on the one or more devices, wherein the position determined for each of the plurality of notifications is determined based at least in part on a type of each of the plurality of notifications;
sending a first notification of the plurality of notifications to at least one device of the one or more devices in a first period of time;
determining that sending a second notification of the plurality of notifications conflicts with the first notification as displayed on the at least one device by comparing the position determined for the first notification to the position determined for the second notification, wherein the second notification conflicts with the first notification as displayed within the user interface when the position determined for the second notification for presenting the second notification within the user interface is within a threshold distance of the position of the first notification as displayed within the user interface; and
in response to determining that sending the second notification conflicts with the first notification, determining a second period of time subsequent to the first period of time to send the second notification to the at least one device based at least in part on at least one of a lapse of a predetermined amount of time or an occurrence of an event; and
sending the second notification to the at least one device in the second period of time for display within the user interface.

2. The system as claim 1 recites wherein the priority level is assigned to each of the plurality of notifications based at least in part on one or more of a source of each of the plurality of notifications, an identifier associated with each of the plurality of notifications, or a timing associated with each of the plurality of notifications.

3. The system as claim 2 recites wherein, the identifier associated with at least one of the plurality of notifications comprises an indication that the one of the plurality of notifications includes content that is associated with security, compliance, an update, or a new feature.

4. The system as claim 3 recites wherein the priority level is assigned to each of the plurality of notifications such that a highest priority level is assigned to one or more of the plurality of notifications that are at least one of expressly requested by the profile or associated with security or compliance content and a successively lower priority level is assigned to one or more of the plurality of notifications including content associated with an update or a new feature.

5. The system as claim 1 recites, wherein the operations further comprised:
accessing a third notification of the plurality of notifications;
determining that the first notification and the third notification are associated with a same priority level;
determining that the first position of the first notification corresponds to a first region of the regions of the user interface;
determining a third position of the third notification;
determining that the third position of the third notification corresponds to a third region of the regions of the user interface, wherein the third region is a threshold distance away from the first region; and
sending the third notification to the at least one device during the first period of time.

6. The system as claim 1 recites, wherein the first period of time corresponds to a first session and the second period of time corresponds to a second session.

7. The system as claim 1 recites, wherein:
the profile corresponds to at least two devices of the one or more devices; and
the operations further comprise:
based at least in part on sending the first notification to the at least one device, determining that a user associated with the profile interacted with the first notification; and
based at least in part on determining that the user associated with the profile interacted with the first notification, suppressing sending the first notification to other devices of the at least two devices.

8. A method comprising:
accessing a plurality of notifications from a queue storing the plurality of notifications;
determining an identifier associated with each of the plurality of notifications;
determining a region in a user interface associated with a presentation of each of the plurality of notifications, wherein the region in the user interface of each of the plurality of notifications is determined based at least in part on a type of each of the plurality of notifications;

determining an order for sending each of the plurality of notifications to a device associated with a profile, wherein determining the order is based at least in part on the identifier and the region in the user interface associated with the presentation of each of the plurality of notifications, wherein determining the order based at least in part on the region includes determining if one or more of the plurality of notifications conflict, wherein determining that one or more of the plurality of notifications conflict includes comparing the region determined for one of the plurality of notifications to the region determined for a different one of the plurality of notifications, wherein one or more of the plurality of notifications conflict when the region determined for the one of the plurality of notifications is within a threshold distance away from the region determined for the different one of the plurality of notifications;

determining, based on determining if one or more of the plurality of notifications conflict, a number of the plurality of notifications to be sent to the profile in a period of time;

sending the number of the plurality of notifications to the device based at least in part on the order; and sending one or more subsequent notifications to the device in one or more subsequent periods of time that are determined based at least in part on predetermined criteria.

9. A method as claim 8 recites, wherein sending the number of the plurality of notifications to the device based at least in part on the order includes accessing a first individual notification of the plurality of notifications;

accessing a second individual notification of the plurality of notifications;

determining that the first individual notification and the second individual notification have a same priority level;

determining that the first individual notification is associated with a first region in the user interface;

determining that the second individual notification is associated with a second region in the user interface;

determining a spatial relationship between the first region and the second region; and sending the first notification and the second notification to the device based at least in part on the spatial relationship.

10. A method as claim 9 recites, wherein sending the first notification and the second notification to the device based at least in part on the spatial relationship includes determining that the first region is within a threshold distance of the second region;

sending the first notification at a first time associated with the period of time; and sending the second notification at a second time associated with a subsequent period of time of the one or more subsequent period of time.

11. A method as claim 9 recites, wherein sending the first notification and the second notification to the device based at least in part on the spatial relationship includes determining that the first region is a threshold distance away from the second region; and sending the first notification and the second notification within a same period of time.

12. A method as claim 8 recites, wherein the predetermined criteria includes at least one of a lapse of a predetermined amount of time or an occurrence of an event.

13. A method as claim 12 recites, further comprising determining the occurrence of the event based at least in part on detecting user interaction with the user interface.

14. A device comprising:
one or more processors; and
memory;
the one or more processors configured to execute instructions stored in the memory to perform operations comprising:
accessing a plurality of notifications associated with a profile;
determining a position in a user interface associated with a presentation of each of the plurality of notifications, wherein the position in the user interface of each of the plurality of notifications is determined based at least in part on a type of each of the plurality of notifications;
assigning a priority level to each of the plurality of notifications based at least in part on an identifier associated with each of the plurality of notifications;
ranking the plurality of notifications based at least in part on the priority level and the position determined for each of the plurality of notification, the position determined for each of the plurality of notifications corresponding to a region of the user interface where the notifications are to be presented, wherein ranking the plurality of notifications based on the position includes determining if two or more the plurality of notifications conflict, wherein determining if two or more of the plurality of notifications conflict includes comparing the region of a first notification of the plurality of notifications to the region of a second notification of the plurality of notification and, wherein the first notification and the second notification conflict when the region of the first notification is within a threshold distance away from the region of the second notification;
sending the first individual notification of the plurality of notifications to a user device associated with a profile, wherein the first individual notification is associated with a first priority level; and
sending the second individual notification of the plurality of notifications to the user device at a time subsequent to sending the first individual notification, wherein the second individual notification is associated with at least one of:
a second priority level that is a lower priority than the first priority level; or
conflicts with the first notification.

15. A device as claim 14 recites, wherein at least one of the plurality of notifications includes a data packet including text providing a notice of an event and a function for interacting with the at least one of the plurality of notifications.

16. A device as claim 15 recites, wherein the operations further comprise:
receiving feedback associated with the notification;
determining approval scores associated with the first notification;
determining that a first approval score associated with the at least one of the first notification is less than a threshold value; and
initiating a workflow to disable the first notification.

17. A device as claim 14 recites, wherein the operations further comprise:
accessing a third notification of the plurality of notifications;

determining that the third notification is associated with a third priority level that is a lower priority than the first priority level;

suppressing the third notification;

determining expiration metadata associated with the third notification; and based at least in part on the expiration metadata, sending the third individual notification to the user device associated with the profile based at least in part on a lapse of time or occurrence of an event.

18. A device as claim 14 recites, wherein the operations further comprise:

accessing a third individual notification of the plurality of notifications;

determining that the third notification is associated with a third priority level that is a lower priority than the first priority level;

suppressing the third notification;

determining expiration metadata associated with the third individual notification; and based at least in part on the expiration metadata, disabling the third individual notification.

19. A device as claim 14 recites, wherein:

the profile is associated with a plurality of user devices; and the operations further comprise:

based at least in part on sending the first notification to the user device, determining that a user associated with the profile interacted with the first notification; and suppressing sending the first notification to other user devices of the plurality of user devices.

\* \* \* \* \*